United States Patent [19]

Oikawa et al.

[11] 4,425,392

[45] Jan. 10, 1984

[54] NEEDLE PUNCHED PAPERMAKING FELT AND METHOD OF MANUFACTURING THE SAME

[75] Inventors: Naoyuki Oikawa; Wako Sato, both of Ichikawa; Osamu Tanaka, Kashiwa, all of Japan

[73] Assignee: Ichikawa Woolen Textile Co., Ltd., Tokyo, Japan

[21] Appl. No.: 361,560

[22] Filed: Mar. 25, 1982

[30] Foreign Application Priority Data

Apr. 23, 1981 [JP] Japan ................... 56-60686

[51] Int. Cl.³ .................. B32B 5/06; B32B 5/26; D21F 7/08; D21F 7/12

[52] U.S. Cl. ........................ 428/90; 28/110; 162/358; 162/DIG. 1; 428/90; 428/91; 428/95; 428/212; 428/234; 428/246; 428/249; 428/252; 428/300; 139/383 A

[58] Field of Search .................. 162/358, DIG. 1; 139/383 A; 28/110; 428/212, 234, 300, 90, 91, 95

[56] References Cited

U.S. PATENT DOCUMENTS

| | | | |
|---|---|---|---|
| 3,214,327 | 10/1965 | Wicker et al. | 162/358 |
| 3,214,330 | 10/1965 | Wicker et al. | 162/358 |
| 3,657,068 | 4/1972 | Ivanowicz | 162/358 |
| 3,928,699 | 12/1975 | Fekete | 162/DIG. 1 |
| 4,107,367 | 8/1978 | Fekete | 162/358 |
| 4,162,190 | 7/1979 | Ashworth | 162/358 |
| 4,187,618 | 2/1980 | Diehl | 162/358 |
| 4,199,401 | 4/1980 | Liu et al. | 162/358 |

FOREIGN PATENT DOCUMENTS

| | | | |
|---|---|---|---|
| 1407564 | 6/1965 | France | 162/DIG. 1 |
| 1338837 | 11/1973 | United Kingdom | 162/358 |

*Primary Examiner*—James C. Cannon
*Attorney, Agent, or Firm*—Bucknam and Archer

[57] ABSTRACT

A needle punched papermaking felt is described which comprises a plurality of layers of foundation fabrics formed in an endless form by joining the opposite edges of long woven form foundation fabrics or foundation fabrics woven in an endless form, laying over one or both sides of said foundation fabrics batts consisting of synthetic fibers or natural fibers or mixtures thereof, and by felting by a needle punching process to cause the component fibers to be entangled with each other. A thin layer of batts consisting of synthetic fibers, natural fibers or their mixtures, may be interposed between the adjacent layers of the foundation fabrics. The method of manufacture comprises the steps of placing in a needle punching machine under tension, a plurality of endless foundation fabrics in a long woven form, or a plurality of relatively easily woven foundation fabrics in an endless form, or both, applying and laying batts consisting of synthetic fibers or natural fibers or their mixtures over the foundation fabrics while the foundation fabrics are being advanced in the needle punching machine, and needle punching the combination of the superimposed foundation fabrics and batts so that the component fibers are caused to be entangled with each other.

2 Claims, 4 Drawing Figures

NEEDLE PUNCHED PAPERMAKING FELT AND METHOD OF MANUFACTURING THE SAME

This invention relates to paper making felts and more specifically to novel needle punched felts and to a novel method of manufacture of the novel needle punched felts.

Recently, the papermaking industry has employed papermaking machines of greater size and increased operating rate for the purpose of improving the papermaking efficiency which has required papermaking felts of greater size as compared with the conventional papermaking felts. In addition to the requirement of a greater size, needle punched felts which are resistant to yielding to the high nipping pressure applied to the felts by press rollers and which have smooth and soft working surfaces, have been in demand to maintain the size and shape of the felts the same under high operating speed, to provide good squeezing capability and to avoid marking on papers. Accordingly, strong and relatively hard yarns have been used for preparing the foundation fabrics of the papermaking felts, and in most cases, double layer fabrics or multiple layer fabrics are used, since foundation fabrics of sufficient thickness are required. Another requirement is the noncompressibility of the component yarns, to provide sufficient dewatering capacity and containing a large quantity of water squeezed out from wet paper. Furthermore, in order to avoid the vibration of the press rollers, the component foundation fabric woven in a long woven form must be joined at its opposite edges to form an endless fabric having a flat surface over the entire area without forming a rugged seam, or the component fabric must be woven in an endless form, namely, with the hollow weave. However, weaving a multiple layer fabric of the hollow weave type with strong and relatively hard yarns, is extremely difficult, needs skilled workers, and further it is necessary to use a special heavy loom, since it is extremely difficult to weave a fabric of stable quality with an ordinary loom for weaving fabrics and the resulting fabric would be likely to have many faults. The necessity of using heavy looms increases the equipment cost.

An object of the present invention is to provide a novel method for the manufacture of papermaking felt which may be carried out with less expensive equipment and which gives a papermaking felt with properties equal or superior to conventional felts.

Another object is to provide a papermaking felt which is prepared from foundation fabrics woven with ordinary looms.

The invention is further illustrated by the accompanying drawing of which:

Figure 1:
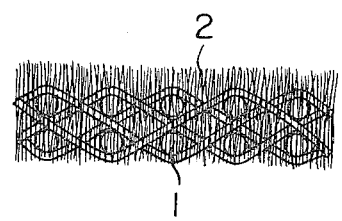
FIG. 1 is a conventional needle punched papermaking felt.
Figure 2:
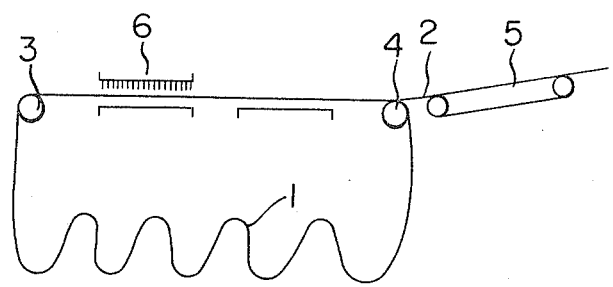
FIG. 2 is a schematic side elevational view of a needle punching machine for manufacturing the needle punched felt of FIG. 1.

As shown in FIG. 1, the conventional papermaking felt is manufactured by weaving a foundation fabric 1 of a multiple layer construction with a special heavy loom, then laying batts of staple fibers 2 over the foundation fabric 1, and finally needle punching the layers of the foundation fabric 1 and the batts 2 of staple fibers to cause the component fibers to be entangled with each other. In the manufacturing process for the conventional felts as shown in FIG. 2, an endless foundation fabric 1 of a multiple layer construction is arranged between a driving roller 3 and a driven roller 4 with the upper side horizontal and the lower side kept loose. A batt of staple fibers 2 conveyed by a lattice 5 is wound around the foundation fabric 1 with the required number of turns while the layer of batt 2 is subjected to the needle punching operation from a needle board 6.

This conventional felt, however, inevitably increases the manufacturing cost, as already mentioned hereinabove, due to various reasons, namely the high cost of equipment due to the necessity of using special costly heavy loom, and the necessity of many hours and expense involved in training operators due to requirement of advanced and skilled weaving techniques.

The crux of the present invention resides first in providing a plurality of one or two kinds of foundation fabrics woven with an ordinary loom for papermaking felt, without a special heavy loom, in a long woven form, joining then at the respective opposite edges to form endless fabrics and relatively easily woven foundation fabrics woven in an endless form and in hollow weave, superimposing them one over the other, laying batts of fibers over one or both sides of the layers of foundation fabric, and then needle punching the combination of the foundation fabric and the layers of the batts. Thus, a papermaking felt having papermaking capability which is the same or superior to that of the conventional felts is provided easily and at a low cost. The product is a needle punched papermaking felt comprising a plurality of layers of foundation fabric formed in an endless form by joining the opposite edges of long woven fabric and/or relatively easily woven foundation fabrics woven in an endless form, each of the foundation fabrics consisting of synthetic filament yarns, synthetic fiber spun yarns, synthetic fiber/natural fiber blended spun yarns or two or more kinds of these yarns, the batts consisting of synthetic fibers and/or natural fibers, the batts being laid over one or both sides of the foundation fabric, and felted by a needle punching process to cause the component fibers to be entangled with each other.

According to this invention, the method of manufacturing the needle punched papermaking felt, comprises weaving foundation fabrics in a long woven form and joining their respective opposite edges to form endless fabrics having seams, weaving relatively easily woven foundation fabrics woven in an endless form, placing either a plurality of the endless fabrics having seams or a plurality of the relatively easily woven fabrics woven in an endless form, or a plurality of both of the former foundation fabrics and the latter foundation fabrics in a superimposed relationship in a needle punching machine under tension, supplying and laying batts consisting of synthetic fibers and/or natural fibers over the superimposed foundation fabrics while the superimposed foundation fabrics are being advanced in the needle punching machine and needle punching the combination of the superimposed foundation fabrics and the batts so that the component fabrics are caused to be entangled with each other.

Figure 3:
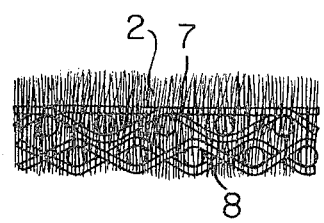
FIG. 3 is a cross sectional view of a needle punched papermaking felt according to the present invention.

As shown in FIG. 3, a needle punched papermaking felt of the present invention comprises the outer foundation fabric 7 and the inner foundation fabric 8 superimposed one over the other, each foundation fabric being a fabric woven in a long woven form and formed in an endless form by joining the opposite edges thereof or a relatively easily woven foundation fabric woven in an endless form in a hollow weave, and laying batts 2 over one or both sides of the foundation fabric. The combination of the foundation fabrics and the batts is subjected to a needle punching process to form a felt by making the component fibers of the warps and wefts consisting of the foundation fabric and the component fibers of the batts to be entangled firmly with each other. The felt thus produced is subjected to finishing processes, such as chemical treatments and singeing, according to any specific purposes.

Regarding the woven construction of the foundation substrate fabric, the fabric woven in a long woven form and formed in an endless form by joining the opposite edges may be, to a certain extent, of a complex woven construction, while the fabrics woven in an endless form are preferably of a relatively simple woven construction, since the number of yarns in a unit area is doubled in a hollow weave as compared with that of a long woven form. Preferably, all the foundation fabrics are single layer fabrics in order to facilitate their preparation and also to achieve high paper making capability, such as dewatering ability. The foundation fabrics may also comprise a combination of multiple layer fabrics and single layer fabrics, or may be all multiple layer fabrics. When a multiple layer fabric is used, it is preferable to weave the fabric in a long woven form, and a long woven fabric is then formed in an endless form by joining its opposite edges according to a conventional method. Specifically, some wefts are removed from each edge part of the fabric and the warps of one side edge replace alternately the corresponding warps of the other side edge. In joining the edges, it is essential to make the seam level identical in construction with the other part. The respective woven construction, component yarns, yarn densities, length ratio and width ratio of the foundation fabric are selectively determined so that the felt can meet the requirements of the papermaking industry, such as dewatering ability, pickup performance, dimensional stability, marking preventing capability, resistance to tension and wear resistance. All the parameters also are determined so that the superimposed foundation fabrics are piled up perfectly one over the other without stretching and slackening even if some shrinkage or elongation of the foundation fabrics is caused by the needle punching process.

Generally, it is preferable to form the outer foundation fabric 7 with yarns of superior elasticity in a dense construction to provide a surface capable of preventing the marking, while it is preferable to form the inner foundation fabric 8 with non-compressible yarns in a relatively coarse construction to provide the inner foundation fabric with the capability of maintaining empty spaces under a high compressive force and good dewatering ability. Synthetic fiber spun yarns, synthetic fiber/natural fiber blended spun yarns, synthetic multifilament yarns or synthetic monofilament yarns are used as the component yarns of fabrics. Single synthetic monofilament yarns or twisted synthetic monofilament yarns are preferable particularly for the needle punched felts used under high speed and high nipping pressure. These yarns are used individually or in combination of different types. Synthetic fibers of polyamides, polyesters, polyacrylonitrile fibers, polyolefin fibers and polypropylene fibers are used. Wool is used in most cases as the natural fiber component. However, cotton and flax may also be used as the material for the natural fibers. Epoxy resins, phenol resins, melamine resins, formaldehyde resins, polyamide resins, polyvinyl resins and polyurethan resins are used for the resin treatment of the felts.

Batts are formed in one to ten layers and are needled with foundation fabrics while the layers of batts are being laid over the surface of the foundation fabric or are needled several times after the laying of batts has been completed to cause the component fibers to be firmly entangled with each other.

A thin layer of the batt may also be interposed between the adjacent component fabrics. This provision of a thin layer of the batt contributes to enhancing the binding between the component foundation fabrics as well as increasing the elasticity of the felt.

Figure 4:
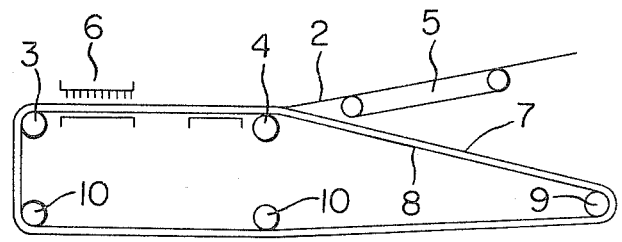
FIG. 4 is a schematic side elevational view of a needle punching machine for manufacturing the needle punched felt of FIG. 3.

Needle punched papermaking felts according to the present invention, are manufactured by using a needle punching machine as illustrated in FIG. 4. A plurality of foundation fabrics woven in endless forms or woven in long woven forms and joined at their respective opposite edges to form endless fabrics taking into consideration the woven construction, component yarns, yarn density, length ratio and width ratio as described hereinbefore, are laid one over the other and stretched over the rollers of the needle punching machine. The layers of the foundation fabrics are tightened with a stretching roller 9 so that the outer foundation fabric 7 and the inner foundation fabric 8 are tightened and made to adhere to each other, without any slackening, and then turned slowly by a driving roller 3 and a driven roller 4 along the guide rollers 10. A batt of fibers is supplied continuously over the surface of the foundation fabric 7 from feed lattice 5 in the required number of layers while the foundation fabrics 7 and 8 and the layer of the batt are subjected to a needling operation by means of the needle board 6.

After the predetermined number of layers of batt has been formed over the surface of foundation fabric 7, the batt supply is interrupted. The foundation fabrics and the layers of the batt are subjected to further needling if desired. Thus, the component fibers are caused to be entangled firmly with each other. When it is required that the felt be provided with a batt on the opposite side of the foundation fabric, it is only necessary to turn the assembly inside out and to repeat the same procedure of supplying the batt and needling.

When it is required that the felt be provided with thin layers of batts between the adjacent foundation fabrics, the above-described process is modified as follows: At first, a single foundation fabric is subjected to the step of supplying batt and to the needling step, then the batt supply is interrupted after a thin layer of batt has been applied over the surface of the foundation fabric. The first layer of the first foundation fabric and the first thin layer of batts is then loosened, and a second foundation fabric is laid over the first thin layer of batt, which has been formed over the surface of the first foundation fabric. Then the foundation fabrics are tightened and the second thin layer of batts is applied and the needling procedure is repeated. After the needling process, the felt is subjected to conventional finishing processes, such as chemical treatment and singeing, according to the specific purpose.

It is obvious from what has been described hereinabove, that, since the foundation fabric of the needle punched papermaking felt of the present invention is formed by laying a plurality of foundation fabrics one over the other, various foundation fabrics of different woven constructions, component yarns and yarn densities may be selectively combined to provide the foundation fabric with papermaking properties. Accordingly, the papermaking properties such as dewatering ability, dimensional stability, marking preventing property and wear resistance, are the same or superior to those of conventional papermaking felts. Further, according to the present invention, the cost of equipment is remarkably reduced, only a reduced floor space for installing the machine is necessary, and time ordinarily required to train personnel is saved because the operators of ordinary skill may meet the operation requirements, since the foundation fabrics of the present invention may be woven with an ordinary loom for weaving them without using the special heavy loom which is necessary for conventional methods. Indeed, only a stretching roller for the needle punching machine is necessary according to the present invention. When some special heavy loom has already been installed, the weaving efficiency will be improved if the special heavy looms are used for weaving relatively difficult woven foundation fabrics in case of a long woven form or relatively easily woven foundation fabrics in case of an endless woven form. Still further, even if additional looms are necessary for the purpose of increasing the production, it is only necessary to install ordinary looms for papermaking felt. Thus, the present invention permits to reduce remarkably the manufacturing cost.

The following examples are described in detail for the purpose of better illustration of the invention:

EXAMPLE 1

An outer foundation fabric was woven in a long woven form with an ordinary loom using polyamide staple fiber/wool blended spun yarns of 5's in a construction of a warp density: 58 ends/5 cm, weft density: 52 picks/5 cm, length ratio: 102% and ⅜ broken twill weave. An inner foundation fabric was woven similarly to the outer fabric by using 1800 denier polyamide monofilament yarns in a construction of a warp density: 48 ends/5 cm, weft density: 42 picks/5 cm, length ratio: 100% and plain weave. Then the foundation fabric is joined and formed to an endless form according to a conventional method as described hereinabove. These fabrics were stretched tightly on a needle punching machine by laying them one over the other as shown in FIG. 4. The foundation fabric and the layer of polyamide staple fiber/wool blended fibers were subjected to needling while the batt was applied over the surface of foundation fabric in four layers to form a felt. This felt was subjected to the conventional drying and singeing processes. Thus, a needle punched papermaking felt was obtained. The respective water contents of wet papers after squeezing with the needle punched felt prepared according to this example, and with a conventional needle punched felt comprising a single sheet of double layer fabric of ⅜ broken twill weave outer fabric and plain weave inner fabric, were 56% and 58%, which showed the superiority of the felt of the present invention over the conventional felt in dewatering ability. No mark was observed over the surface of the squeezed paper. Further, the cost of equipment was remarkably reduced since the installation of any special heavy loom was not necessary.

EXAMPLE 2

An outer foundation fabric was woven in an endless form with an ordinary loom by using polyamide staple fiber spun yarns of 6's in a construction of a warp density: 56 ends/5 cm, density: 48 picks/5 cm, length ratio: 102% and plain weave. An inner foundation fabric was woven similarly to the outer one by using twisted yarns consisting of two 840 denier polyester monofilament yarns in a construction of a warp density: 48 ends/5 cm, weft density: 40 picks/5 cm, length ratio: 100% and plain weave. The outer foundation fabric and the inner foundation fabric were laid one over the other and stretched tightly on a needle punching machine in the manner as described hereinabove. The foundation fabric and the layers of batt of polyacrylonitrile staple fibers were subjected to needling while the batt was applied over the surface of the foundation fabric in five layers to form a felt. The felt was subjected to four cycles of needling after the batt supply had been interrupted. Thus, a needle punched felt was obtained. This felt exhibited excellent dimensional stability and good dewatering ability. The use of an ordinary loom provided the same advantages as in Example 1.

EXAMPLE 3

An outer foundation fabric was woven with an ordinary loom by using 640 denier polyamide monofilament yarns in a construction of a warp density: 54 ends/5 cm, weft density: 50 picks/5 cm, length ratio: 101% and ⅓ broken twill weave. An inner fabric was woven similarly to the outer one by using 1000 denier polyamide monofilament in a construction of a warp density: 50 ends/5 cm, weft density: 42 picks/5 cm, length ratio: 100% and plain weave. The outer foundation fabric and the inner foundation fabric were stretched tightly on a needle punching machine in the manner as disclosed hereinabove. The foundation fabric and batts of 50% polyamide staple fiber/50% wool were subjected to needling while the batt was applied over the surface of the foundation fabric in five layers, and the combination was needled for three cycles after the batt supply had been interrupted. Thus, a needle punched papermaking felt was manufactured. This needle punched felt exhibited excellent dewatering ability and good dimensional stability and its life was twice as long as that of a conventional felt.

EXAMPLE 4

An outer foundation fabric was woven in a long woven form with an ordinary loom by using the twisted yarns of two 420 denier polyacrylonitrile multifilament yarns as warps and polypropylene staple fiber/wool blended spun yarns of 5's as wefts in a construction of a warp density: 60 ends/5 cm, weft density: 56 picks/5 cm, length ratio: 101% and weft backed weave. This is a woven construction which may be formed relatively easily as in the case of multiple layer fabric. An inner foundation fabric was woven in a long woven form with the same loom by using 1800 denier polyester monofilament yarns in a construction of warp density: 50 ends/5 cm, weft density: 42 picks/5 cm, length ratio: 101% and plain weave. Both foundation fabrics were formed in the endless forms respectively by joining their respective opposite edges, and then were extended tightly on a needle punching machine in the manner as described hereinabove. The foundation fabric and the layer of batts of polyester staple fiber/wool blended fibers were subjected to needling while the batt was applied over the surface of the foundation fabric in four layers. Then the foundation fabric was turned inside out, and subjected to needling while a layer of the batt was applied over the inner surface of the foundation fabric. The outer surface and inner surface of the felt were subjected additionally to a single cycle of needling respectively after the supply of the batt had been interrupted to cause the component fibers to be entangled firmly with each other. The felt was finally subjected to a melamine resin treatment. In this manner, the needle punched papermaking felt was manufactured. The water content of wet paper squeezed by this felt was 55% which was 2% lower than that of a paper squeezed by a conventional papermaking felt of the same specifications except that the foundation fabric of the felt was of a triple layer fabric woven with a special heavy loom, which demonstrated the superiority of the felt of the present invention with respect to the dewatering ability. The present felt was excellent in preventing marking and dimensional stability. This embodiment also remarkably reduced the cost of equipment, since the foundation fabric could be woven with an ordinary loom.

EXAMPLE 5

The outer foundation fabric was woven in an endless form with a special heavy loom by using epoxy resin treated polyester staple fiber/polyamide staple fiber blended spun yarns of 6's in a construction of a warp density: 58 ends/5 cm, weft density: 52 picks/5 cm, weft-length ratio: 102% and weft backed weave. An inner foundation fabric was woven in a long woven form with an ordinary loom by using epoxy resin treated 1800 denier single twisted polyamide multifilament yarns in a construction of a warp density: 50 ends/5 cm, weft density: 42 picks/5 cm, length ratio: 100% and plain weave, and then formed in an endless form by joining their opposite edges according to a conventional method. First, the inner foundation fabric was stretched tightly on a needle punching machine and subjected to needling while a thin layer of a batt of polyester staple fiber/wool fiber was applied, then loosened and the outer foundation fabric was laid over the inner foundation fabric carrying a thin layer of needle punched batt. The foundation fabrics were then restretched. The fabrics thus combined were subjected to needling while five layers of the batts were being formed over the surface of the outer foundation fabric. The combination of the foundation fabrics and the batts was subjected further to two cycles of needling after the supply of the batt had been interrupted to finish the papermaking felt. The component fabrics of the felt were made to adhere firmly to each other. The felt thus produced had an elasticity greater than that of conventional felts, exhibits good dimensional stability and approximately the same dewatering ability as that of conventional felts.

What is claimed is:

1. A needle punched papermaking felt, comprising a plurality of layers of foundation fabrics formed in an endless form by joining the opposite edges of long woven form foundation fabrics or foundation fabrics woven in an endless form, each of said foundation fabrics consisting of synthetic filament yarns, synthetic fiber spun yarns, synthetic fibers-natural fiber blended spun yarns and mixtures thereof, laying over one or both sides of said foundation fabrics batts consisting of synthetic fibers or natural fibers or mixtures thereof, and by felting by a needle punching process to cause the component fibers to be entangled with each other wherein a thin layer of said batts consisting of synthetic fibers, natural fibers or mixtures thereof, is interposed between the adjacent layers of said foundation fabrics and wherein the adjacent layers of said foundation fabrics are characterized by the outermost layer having yarns of relatively high elasticity in a relatively dense construction, and the innermost layer having relatively non-compressible yarns in a relatively coarse construction.

2. The method of manufacturing a needle punched papermaking felt, comprising the steps of placing in a needle punching machine under tension, a plurality of (1) foundation fabrics in a long woven form, the respective opposite edges thereof being joined to form endless fabrics having seams, or a plurality of (2) relatively easily woven foundation fabrics in an endless form, or a plurality of both of said foundation fabrics (1) and said foundation fabrics (2), applying and laying batts consisting of synthetic fibers or natural fibers or mixtures thereof over said foundation fabrics while said foundation fabrics are being advanced in said needle punching machine, and needle punching the combination of said superimposed foundation fabrics and said batts while under tension so that the component fibers are caused to be entangled with each other wherein a thin layer of said batts consisting of synthetic fibers, natural fibers or mixtures thereof, is interposed between said adjacent fabrics, and the method comprises needle punching a first mixed layer of the first one of said foundation fabric and a first thin layer of said batts while said batts are delivered over the surface of said firsrt foundation fabric, interrupting the delivering of said batts, laying the second one of said foundation fabric over said first mixed layer of said first foundation fabric and said first thin layer of batts, delivering a second layer of batts over the surface of said second foundation fabric, needle punching said combination of said first mixed layer and said second foundation fabric and a second thin layer of said batts and repeating said procedure wherein the adjacent layers of said foundation fabrics are characterized by the outermost layer having yarns of relatively high elasticity in a relatively dense construction, and the innermost layer having relatively non-compressible yarns in a relatively coarse construction.

* * * * *